United States Patent [19]

Baas

[11] Patent Number: 5,183,383
[45] Date of Patent: Feb. 2, 1993

[54] WIND TURBINE

[76] Inventor: Hendrik A. Baas, Groningerweg 34, 9738 AB Groningen, Netherlands

[21] Appl. No.: 638,737

[22] Filed: Jan. 8, 1991

[30] Foreign Application Priority Data

Jan. 8, 1990 [NL] Netherlands ............ 9000042

[51] Int. Cl.⁵ .................................. F03B 7/00
[52] U.S. Cl. ................................ 416/9; 416/12
[58] Field of Search ................ 415/9, 10, 11, 12, 13, 415/14, 15, 131, 132 B

[56] References Cited

U.S. PATENT DOCUMENTS

| | | | |
|---|---|---|---|
| 979,405 | 12/1910 | Andrus | 416/10 |
| 1,403,069 | 1/1922 | Burne | 416/132 R |

FOREIGN PATENT DOCUMENTS

| | | |
|---|---|---|
| 46528 | 10/1901 | Fed. Rep. of Germany . |
| 647287 | 6/1937 | Fed. Rep. of Germany . |
| 1013456 | 7/1952 | France . |
| 16146 | 2/1978 | Japan ............ 416/132 A |
| 2157774 | 10/1985 | United Kingdom . |

Primary Examiner—John T. Kwon
Attorney, Agent, or Firm—Jacobson, Price, Holman & Stern

[57] ABSTRACT

A wind turbine of the type having a rotor (1, 31) with a relatively large number of vanes (3-14, 35-40) mounted one behind the other on a central shaft (2, 30) of the rotor. At least a number of the vanes are mounted for free rotation relative to the central shaft and are coupled to adjacent vanes by a catch device (51, 52, 54, 55). A detecting device (100-105) is provided for detecting impending overload of the rotor, and a vane adjusting device (60-67) is provided which in response to impending overload detected by the detecting device can turn the vanes mounted for free rotation relative to the shaft and relatively to one another so that the vanes become at least partially aligned one behind the other.

24 Claims, 3 Drawing Sheets

WIND TURBINE

BACKGROUND OF THE INVENTION

This invention relates to a wind turbine of the type having a rotor with a relatively large number of vanes. Such wind turbines, which are known by the name of American wind turbine or polder draining mill, are known per se, and are used for various purposes, such as pumping water or generating electricity, and the like.

A great advantage of this type of wind turbine is that useful energy is already provided at a low wind force. Another advantage is that such a wind turbine operates with a low speed of the wheel or rotor, so that, under normal conditions, the mechanical load is relatively low, and the vane may be simple and hence inexpensive.

A disadvantage of the American wind turbine is that, owing to the large number of vanes, it has a large wind catching area, and consequently has a poor resistance to high winds, and to gale force winds. Indeed, the known multi-vane wind turbines should be provided with a transverse wind vane, which at a pre-determined wind force automatically turns the rotor out of the wind. In this way, the wind turbine can be prevented from being damaged at high winds, it is true, but at the same time it will cease to provide energy.

BRIEF SUMMARY OF THE INVENTION

It is an object of the present invention to overcome the disadvantage outlined above. For this purpose, according to the present invention, a wind turbine of the kind described is characterized in that the vanes are mounted one behind the other i.e. in axially spaced relationship, on a central shaft of the rotor; that at least a number of the vanes are mounted for free rotation relative to the central shaft of the rotor; that the freely rotatable vanes are coupled to adjacent vanes by catch means; and that detecting means are provided for detecting impending overload of the rotor, and blade adjusting means are provided which in response to such impending overload can turn the blades mounted for free rotation relative to the central shaft and at least one vane fixedly connected to the shaft relatively to one another so that the vanes become at least partially aligned one behind the other.

BRIEF DESCRIPTION OF THE DRAWINGS

One embodiment of the invention will now be described, by way of example, with reference to the accompanying diagrammatic drawings, wherein.

DETAILED DESCRIPTION

Figure 1:
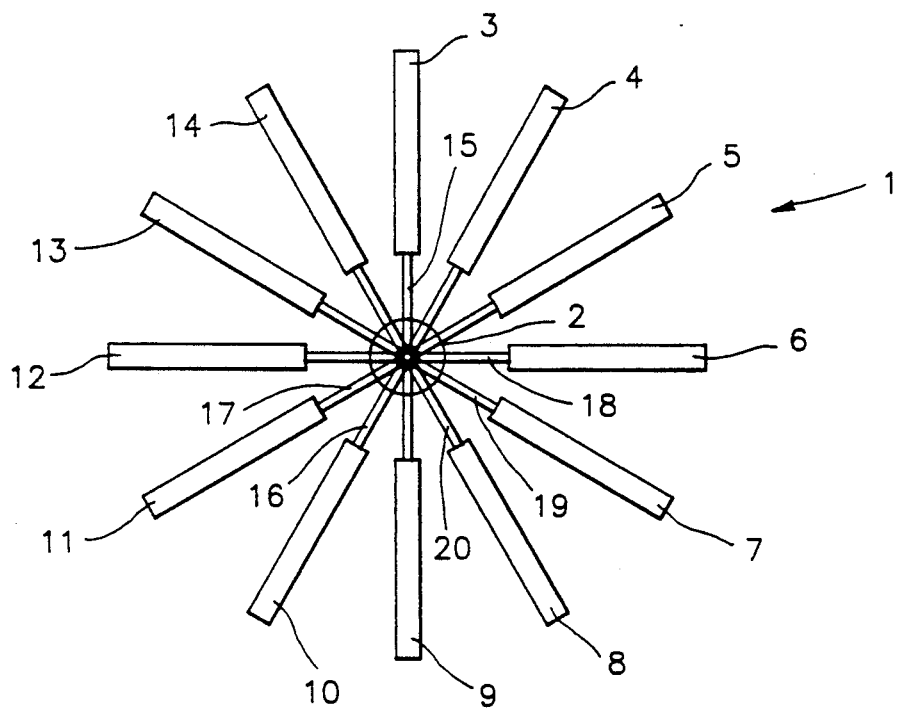
FIG. 1 is a front-elevational view, showing a part of a wind turbine with a relatively large number of vanes.

FIG. 1 shows diagrammatically and in front-elevational view, an example of a rotor 1 of a wind turbine having a relatively large number of vanes. In the example shown, the rotor has a central shaft 2 and twelve vanes 3-14, mounted pairwise on a common rod 15-20, respectively. Such a wind turbine is sometimes called an American wind turbine, and in practice may have a different, often larger, number of vanes.

Figure 2:
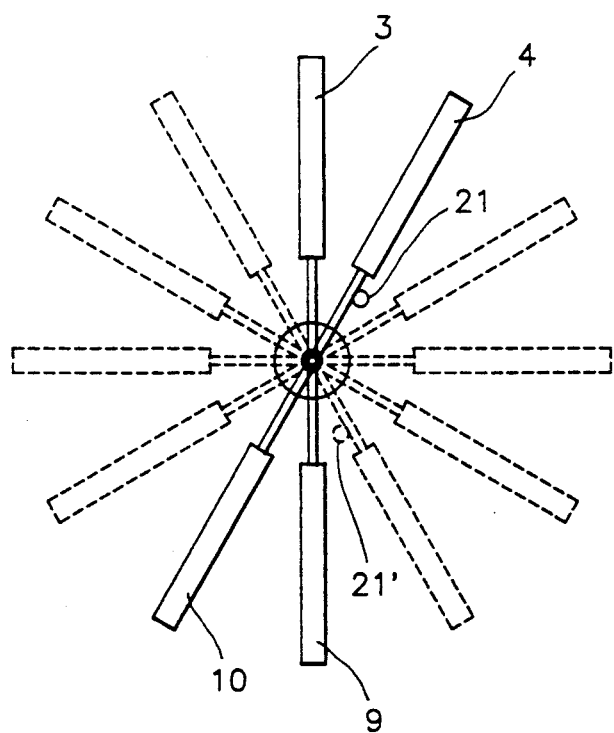
FIG. 2 illustrates the principle of the present invention.

FIG. 2 illustrates the principle of the present invention. FIG. 2 shows a rotor similar to FIG. 1, but now vanes 3, 4 and the associated vanes 9, 10 are visible only. The other vanes have been turned behind the vane pair 4, 10 by means of a position control finger, bar or peg 21. For clarity, FIG. 2 shows the other vanes in their original position in ghost outline, and position control finger 21 is also shown in its inoperative position at 21'.

At normal wind force, the rotor has the shape shown in FIG. 1. At high wind, the vanes are increasingly shifted one behind the other by means of the position control finger or other suitable mechanism. First, vane 8 (and the associated vane 14) are turned behind vane 7 (and vane 13). When the wind force is increasing further, the packet of vanes 8 and 7 (with the associated vanes 14 and 13) are turned behind vane 6 (and vane 12), etc. At very high wind, all pairs of vanes have been turned one behind the other to form a vane packet which behaves as a single pair of vanes. In the example shown, all pairs of vanes have then be turned behind vanes 3 and 9.

Thus, when the wind force is increasing, the wind catching area of the rotor gradually decreases, so that damage to the wind turbine is prevented.

Figures 3, 4:
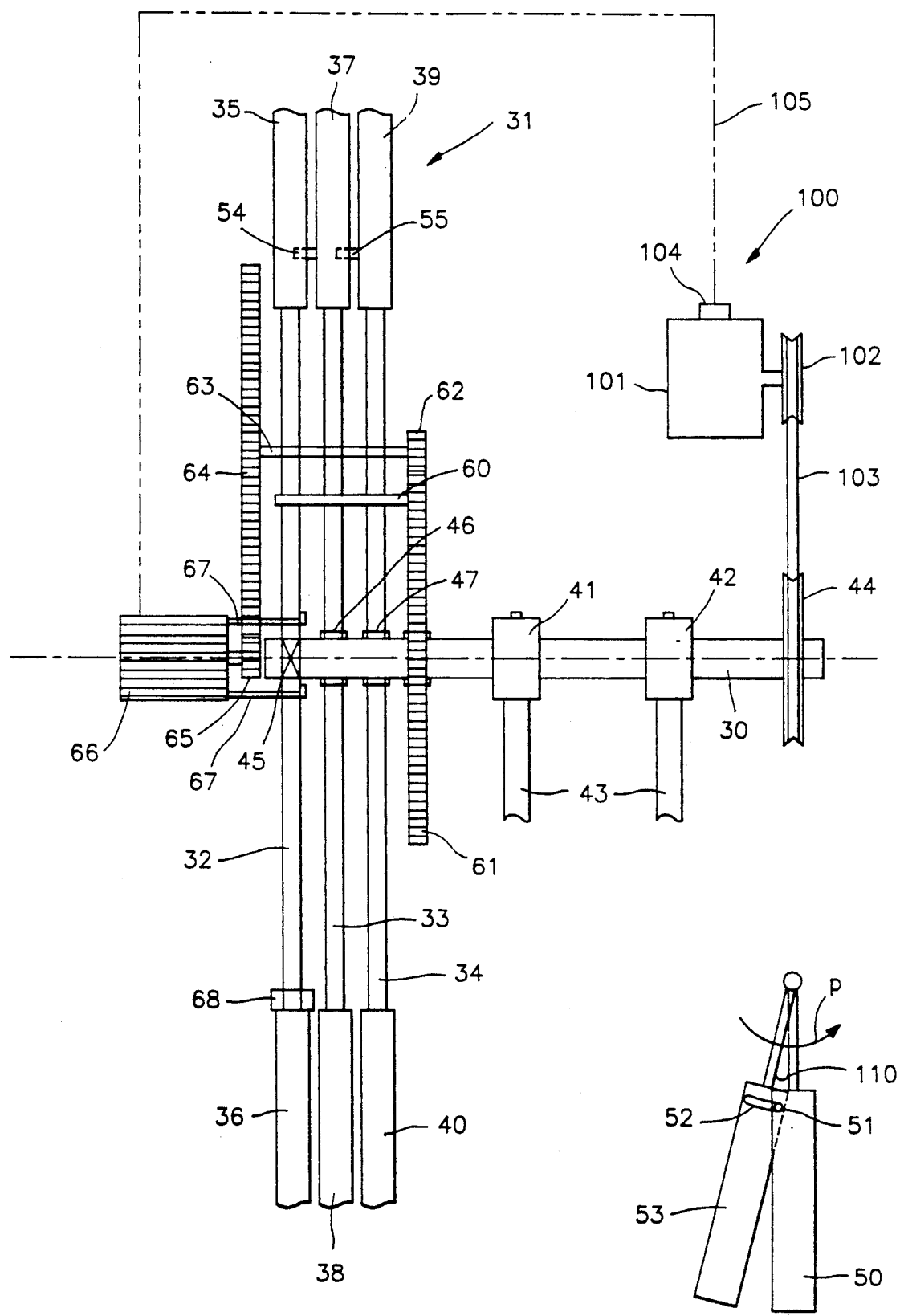
FIG. 3 shows a side-elevational view of a part of an embodiment of a wind turbine according to the present invention.
FIG. 4 shows a detail of an embodiment of a wind turbine according to the present invention.

FIG. 3 shows diagrammatically and in side-elevation view a part of an embodiment of a wind turbine according to the present invention. For clarity, in the example shown, only the central sections of three pairs of vanes are shown. FIG. 3 shows a central shaft 30 of rotor 31 of a wind turbine. Mounted on the central shaft are three pairs of vanes. Each pair of vanes has a common rod 32,33,34, and in this example, each rod carries two vanes 35,36; 37,38; and 39,40, respectively, spaced from the central shaft. The pairs of vanes are not, as conventional, all situated in the same plane, but are mounted on the central shaft one behind the other. Vanes 35,36 form the front pair of vanes.

Behind the vanes, the central shaft is journalled in bearings 41,42, shown diagrammatically, mounted on parts 43 of a substructure of the wind turbine. There is further diagrammatically shown a pulley 44, by means of which an apparatus to be driven, such as a pump, a generator, or the like, can be coupled to the central shaft. However, the drive can alternatively be effected by other known per se means, for example, by means of pulleys as shown, sprocket wheels, gear wheels, a universal joint, etc.

Rod 32 is fixed to the central shaft 30, as shown diagrammatically at 45. Rods 33 and 34, however, are rotatable relative to the central shaft, and may be mounted on the central shaft through the intermediary of a bearing bushing 46,47, or even a ball bearing. In principle, therefore, rods 33 and 34 are freely rotatable relative to the central shaft. However, the vanes, or the rods of the successive pairs of vanes are coupled together through catch means. These catch means permit an angular rotation α between two successive vanes, ranging between 0 degrees and a pre-determined maximum angle of αmax. Generally speaking, angle αmax is 360 degrees/n, where n is the number of vanes, but this is not strictly necessary. In the example of FIG. 2, angle αmax is 30 degrees.

At high winds, α=0 degrees, and the vanes are located one behind the other, i.e. axially aligned. At normal wind, α=αmax, and the vanes are maximally spread out.

The catch means may consist of chains, ropes, or rods, strips or bars hinged together and to the respective vanes, mounted in each case between two successive vanes or rods.

FIG. 4 shows diagrammatically an embodiment in which one vane 50 is provided with a 51 which engages in a groove 52 in the other vane 53, which groove is closed at least at the end pointing in the direction of rotation. The direction of rotation is indicated by an arrow P. In this example, the leading vane 50 is provided with a catch, and the trailing vane has a groove. Alternatively, vane 50 could have the groove and vane 53 the catch. Furthermore, the catch could be secured to a lateral projection of a vane, if a larger angle between two successive vanes is desirable, or the connection could be located further from the central shaft. In FIG. 3, catches are shown diagrammatically at 54 and 55.

As noted before, during normal operation, the vanes are spread out maximally. The pair of vanes 39,40 placed on the central shaft in the rearmost position is then the leading pair of vanes, which through catch 55 takes along pair of vanes 37,38. The pair of vanes 37,38 in turn takes along pair of vanes 35,36 through catch 54. As the pair of vanes 35,36 is connected to the central shaft so as to be restrained from rotation relative to it, the central shaft is then caused to rotate.

As noted above, in order to prevent damage to the wind turbine at wind forces in excess of normal wind, the vanes can be moved into a position in which they are fully or partially aligned one after the other. For this purpose, vane adjusting means are provided. In the example shown in FIG. 3 a position control peg 60 (corresponding to 21 in FIG. 2) turn back the vanes from the maximally spread position, beginning with the leading vane, to decrease the effective number of vanes and hence the wind catching area of the rotor. In the example shown, peg 60 is mounted on a gear 61, placed on the central shaft 30 next to the rearmost rod 34. Gear 61 can in principle rotate freely relative to the central shaft. A relatively small gear 62 meshes with gear 61, and is mounted on a shaft 63 extending through the rods of the vanes. At the front of the packet of vanes, shaft 63 carries a relatively large gear 64, which meshes with a relatively small gear 65 mounted concentrically with the central shaft 30 on the shaft of an electric motor 66. Electric motor 66, that is to say its housing, is fixedly connected to the front, fixed pair of vanes, for example by means of bolts and spacer sleeves, as shown at 67.

Accordingly, in operation, the electric motor rotates along with the central shaft. Gears 61,62,64 and 65 and shaft 63 also, in operation, rotate along with the central shaft, but are at rest relative to each other.

As soon as, however, the position of the vanes relative to each other needs adjustment, for example, with increasing wind, the electric motor 66 is energized. Gear 65 then rotates relative to the central shaft and drives gear 64, which, in turn, through shaft 63 and gear 62 drives gear 61. Consequently, gear 61 rotates relative to the central shaft. During these movements, peg 60 first takes along the leading vane, and, during continued energization, the next vanes until the wind catching area of the rotor has been sufficiently reduced (or increased).

Owing to the selected gear configuration of small gears 62 and 65 and large gears 61 and 64, there is obtained a high-delay transmission, so that the position of peg 60 can be controlled with great accuracy.

The electric motor is energized by means of control signals provided by detection means 100 such as shown in FIG. 3. The detection means are arranged to detect impending overload of the wind turbine and, in response to such detection, to provide control signals to motor 66. The detection means generally indicated at 100 may, for example, be arranged to detect the speed (rpm) of the central shaft, or any apparatus driven by it, and provide a control signal when a pre-determined threshold value is exceeded. Such a speed detector could be a rotational unit 101 driven by a pulley 102 which in turn is driven by a belt 103 engaging pulley 44, a threshold value detector 104, and on electrical conduit 105 for conducting a control signal from detector 104 to vane adjusting motor 66. The detection means may also comprise a measuring device which measures the (electric) energy provided by a generator driven by the central shaft, and issue a control signal when a pre-determined threshold value is exceeded.

It is noted that, after reading the foregoing, various modifications will readily occur to one skilled in the art. Thus the electric motor 66 may be mounted in a different place, and peg 60 may be actuated in a different manner. To balance the eccentrically rotating mass of gears 62,64 and shaft 63, the fixed rod 32 may, if desired, be provided with a counter weight, as shown diagrammatically at 68. The mass of peg 60 could be balanced, for example, by providing gear 61 with a second peg located radially opposite peg 60.

Furthermore, a spring element could be mounted between, for example, the leading vane and the vane coupled with it, which spring element biases the vanes apart to promote the vanes' spreading out from the collapsed position. Thus, for this purpose, in the example of FIG. 4, a spring could be disposed in groove 52, or a spring 110 could be disposed between adjacent rods, which biases catch 51 towards the end of the groove pointing in the direction of rotation.

Also, if desired, the dragger peg may be coupled, either fixedly or resiliently, with the leading vane. The wheel carrying the dragger peg may also be mounted on the central shaft between two rods or even in front of the packet of vanes.

These and similar modifications are considered to fall within the scope of the present invention.

In the foregoing, it has been described that vanes of a rotor of a wind turbine with a relatively large number of vanes can be turned behind at least one vane which is fixedly connected with the central shaft of the rotor. The drawings show an embodiment employing a pair of vanes fixedly connected to the central shaft of the rotor, and behind which other pairs of vanes can be turned out of the wind.

It is also possible to turn the fixed vane or the fixed pair of vanes in front of the freely rotatable (pairs of) vanes. The ultimate effect is the same, namely, that the front vane(s) fully or partially covers or cover the vanes disposed behind the front vane(s) whereby the effective vane area is reduced.

It is also possible to use a plurality of fixed pairs of vanes connected to the central shaft of the wind turbine, referred to hereinafter as a fixed ring of vanes, and a plurality of rings of vanes which are adjustable relative to the central shaft, and are arranged, upon impending overload, to be rotated at least partially behind the fixed ring of vanes.

As, in such a construction, the effective rotor area is relatively large, even if all adjustable rings of vanes have been moved right behind the ring of vanes fixedly connected to the central shaft (the fixed ring of vanes), the vanes of the fixed ring of vanes when at the front for first receiving the wind may advantageously have a shape which is aerodynamically indifferent or passive, that is to say, such a cross-sectional configuration that wind coming from the front does not cause the fixed ring to rotate. In this way the speed can be reduced to zero. The vanes of the fixed ring may, for example, have the shape of an isosceles triangle in section, with the apex directed to the front.

Such a technique can of course also be used with a wind turbine with only one fixed vane or one fixed vane pair, as shown in FIG. 3.

According to a variant of the embodiment with aerodynamically indifferent or passive fixed vane(s) or ring of vanes, the fixed vanes may have an adjustable shape, namely, one which is adjustable between an aerodynamically active and an aerodynamically indifferent or passive shape.

Figure 5:
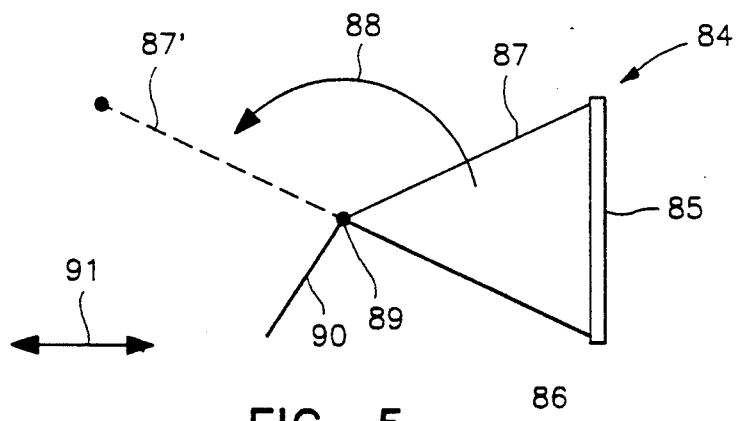
FIG. 5 shows a cross-sectional view of an example of a special adjustable vane for use in a wind turbine according to this invention.

FIG. 5 shows schematically in cross-sectional view, an exemplary embodiment of a vane 34 of adjustable shape. The vane shown has a triangular cross-sectional configuration, such as an isosceles triangular shape for example, with a base 85, a fixed side 86 and a side 87 which is adjustable in accordance with an arrow 88. Side 87 is hinged by hinge pin 89 at the apex of the triangular shape to the fixed side 86 or to the body of the vane for hinging movement about an axis extending lengthwise of the vane. The adjustable side can be moved from a rest position shown in solid lines to an active position shown in dash lines at 87'.

Figure 7:
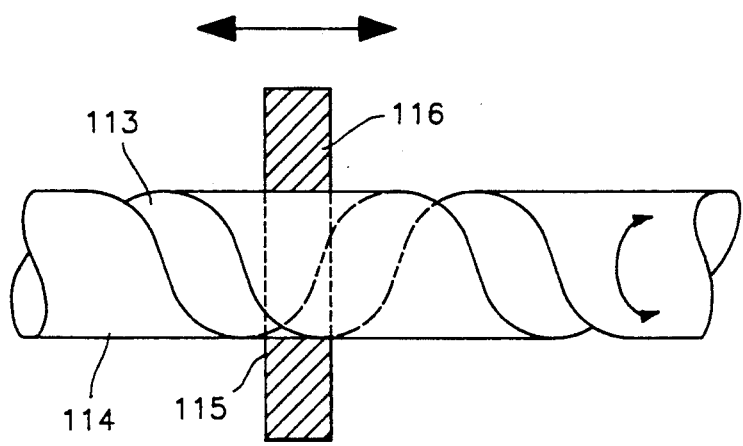
FIG. 7 is a fragmentary partially cross-sectional view of a ring device for operating the adjustable vanes of FIGS. 5 and 6.

For operation of the vane, in the example shown, a hinge pin 89 extends up to the vicinity of the rotor shaft, and is connected to the adjustable side 87 so as to be restrained from rotation relative to it. The end of the hinge pin adjacent to the rotor shaft is further provided with an actuating arm 90 extending obliquely downwards. By exerting a suitable force on the end of the actuating arm, as indicated by way of example in FIG. 5 with an arrow 91, the adjustable side 87 can be adjusted. The actuation of the adjustable side or of the adjustable sides of a plurality of vanes can be effected, for example, by means of a slidable ring or sleeve 112 mounted around the rotor shaft, and driven by the electric motor 66 as soon as peg 60 has moved all vanes behind the fixed vane(s). For the conversion of the rotary movement of the electric motor into a sliding movement, as shown in FIG. 7 use can be made, for example, of a helical groove 113 in the shaft 114 of the electric motor functioning as a cam surface and a cam follower 115 on ring 116 extending into the groove.

Figure 6:
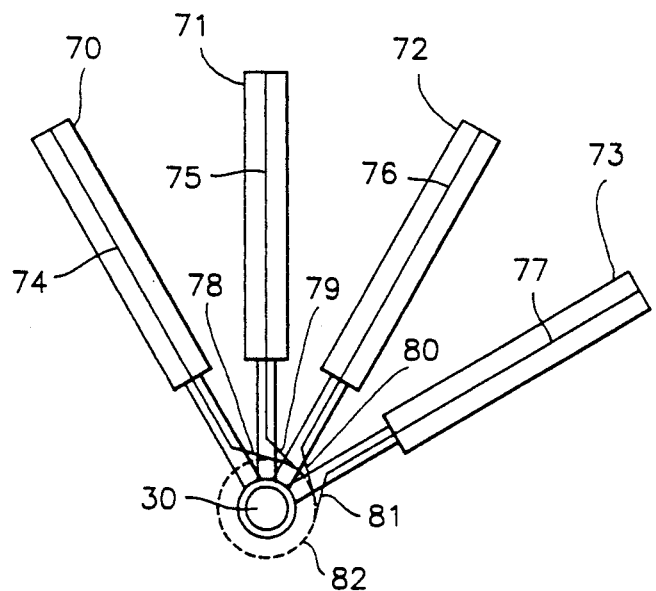
FIG. 6 shows the way in which the adjustable vanes of FIG. 5 can be adjusted.

FIG. 6 shows a diagrammatic front-elevational view of an embodiment of a windmill having a relatively large number of forward vanes, which together form a forward ring of vanes, behind which the other vanes may be aligned in strong winds. The vanes of the forward ring of vanes all have an adjustable shape as shown in detail in FIG. 5 and described above. The central section of a plurality of vanes 70-73 which are of variable shape, with hinge pins 74-77 (corresponding to 89 in FIG. 5) and actuating arms 78-81 (corresponding to 90 in FIG. 5). An operating ring is shown in dash outline at 82. The vanes which are rotatable relative to rotor shaft 30 are not shown in FIG. 6.

It is noted that the actuating arms could be of different shape and that the operating ring, too, could be replaced by a different suitable member. Also, the sides of the triangular cross-sectional shape of the fixed vanes could be of somewhat concavely or convexly curved configuration.

When an aerodynamically indifferent or passive vane is used, or a pair or ring of aerodynamically different vanes for covering the other vanes in full or in part in the event of high winds, it is not necessary for the "fixed" vanes to be actually mounted on the rotor shaft so as to be restrained from rotation relative to it. At least one of the other (sets of) vanes, however, should then be mounted on the rotor shaft so as to be restrained from rotation relative to it.

A suitable example is a wind turbine with two rings of vanes disposed one after the other, with the front ring of vanes having vanes with an aerodynamically indifferent or passive shape, or at any rate vanes with an adjustable shape, which can be brought into an aerodynamically indifferent condition, as described hereinbefore. In the case of high winds, the front ring of vanes can then again be turned to cover the rear ring of vanes, either in full or in part. In that configuration, the front ring of vanes may be mounted on the rotor shaft so as to be restrained from rotation relative to it, and the rear rings so as to be freely rotatable on the rotor shaft, or alternatively, the front ring may be freely rotatable and the rear ring restrained from rotation relative to the shaft. The only essential point is that the vanes of the front and rear rings can be rotated relatively to each other into a position in which the vanes are fully or partially aligned with each other.

The above and similar modifications will readily occur to one skilled in the art after reading the above.

I claim:

1. A wind turbine having a rotor including a plurality of vanes mounted on a shaft and comprising:
   a rotatably mounted central shaft having an axis of rotation;
   a plurality of vanes arranged in sets mounted in axially space relationship on said central shaft;
   at least one of said sets of vanes being freely rotatably mounted on said central shaft for rotation relative thereto;
   at least one of said sets of vanes being non-rotatably mounted on said central shaft for rotation therewith;
   a catch means operatively coupling adjacent sets of vanes together so that rotation of one of said sets rotates at least one adjacent set;
   detecting means for detecting impending overload of said rotor and emitting a signal indicating said overload; and
   vane set adjusting means operatively engageable with said at least one set of freely rotatable vanes and operatively connected with said detecting means for rotating said at least one rotatably mounted set of vanes relative to said shaft and said at least one non-rotatably mounted set of vanes to positions between and including a fully extended position of, where said vanes have a maximum angular displacement relative to each other in the direction transverse to the axis of rotation of said shaft, and an axially aligned position said vanes in response to said overload signal of said detecting means.

2. A wind turbine as claimed in claim 1 wherein said detection means comprises:
   electrical generator means; and
   drive means connecting said central shaft to said generator means for driving said generator means by rotation of said central shaft.

3. A wind turbine as claimed in claim 1 wherein said detecting means comprises:
   means for producing a signal proportional to rotational speed of said central shaft; and
   a threshold value detector for detecting said rotational speed signal and producing an actuating signal for actuating said vane set adjusting means when said rotational speed signal exceeds a predetermined threshold value.

4. A wind turbine as claimed in claim 1 wherein said vane set adjusting means comprises:
   electrical motor means; and
   dragger peg means operatively connected to said electric motor means for rotation relative to said central shaft and engageable with said sets of vanes.

5. A wind turbine as claimed in claim 4 wherein:
   said electric motor means is mounted for rotation with said central shaft and has an output shaft operatively connected to said dragger peg means and having a rotational axis coaxially with said rotational axis of said central shaft.

6. A wind turbine as claimed in claim 5 wherein said dragger peg means comprises:
   a first gear rotatably mounted coaxially on said central shaft for relative rotation thereto;
   a dragger peg mounted on said first gear eccentric to the rotational axis thereof and extending therefrom so that said dragger peg is engageable with said sets of vanes;
   a second gear meshing with said first gear so that it is driven thereby,
   a gear shaft mounted on said second gear for rotation therewith;
   a third gear mounted on said gear shaft for rotation therewith; and
   a fourth gear meshing with said third gear and mounted on said electric motor output shaft for rotation therewith, so that operation of said electric motor drives said output shaft thereby rotating said gears and rotating said dragger peg in an arc around said central shaft for adjusting said sets of vanes between said fully extended position and said axially aligned position.

7. A wind turbine as claimed in claim 4 wherein:
   said electric motor means and at least part of said dragger peg means are disposed on different axial sides of said sets of vanes in the axial direction.

8. A wind turbine as claimed in claim 4 wherein said electric motor means comprises:
   an electric motor mounted on at least one of said non-rotatably mounted sets of vanes so that said electric motor rotates with said central shaft.

9. A wind turbine as claimed in claim 4 wherein:
   said dragger peg means comprises a dragger peg coupled with a freely rotatably mounted set of vanes.

10. A wind turbine as claimed in claim 1 wherein:
    said at least one non-rotatably mounted set of vanes comprises a front pair of vanes; and
    said at least one rotatably mounted set of vanes is downstream of said front pair of vanes relative to the wind direction.

11. A wind turbine as claimed in claim 1 wherein said catch means comprises:
    a groove in a surface on at least one vane of each set of vanes facing a surface on vanes of an adjacent set of vanes; and
    a catch member protruding from at least one vane of said adjacent set of vanes and slidably engaging in said groove for relative movement between said fully extended position and said axially aligned position.

12. A wind turbine as claimed in claim 1 and further comprising:
    spring means mounted between adjacent sets of vanes for resiliently urging said adjacent sets of vanes apart in the direction transverse to said axis of rotation.

13. A wind turbine as claimed in claim 1 wherein:
    one of said sets of vanes is a front set at the end of said sets of vanes in the axial direction opposite to the wind direction; and
    the vanes of said front set have an aerodynamically passive shape whereby said front set is not rotated by wind substantially from the front.

14. A wind turbine as claimed in claim 1 wherein:
    one of said sets of vanes is a front set at the end of said sets of vanes in the axial direction opposite to the wind direction; and
    the vanes of said front set comprise adjustable vanes each having an adjustable cross-sectional configuration adjustable between an aerodynamically active form whereby said front set is rotated by wind substantially from the front and an aerodynamically passive form whereby said front set is not rotated by wind substantially from the front.

15. A wind turbine as claimed in claim 14 wherein each adjustable vane comprises:
    three sides forming a substantially triangular cross-sectional configuration having a front apex at one corner thereof substantially at the front of said vane;
    a hinge pin at said front apex extending lengthwise of said vane and pivotally connecting two sides of said vane so that one of said two sides is rotatable about said hinge pin from the position thereof in said passive form to a position substantially coplanar with the other of said two sides.

16. A wind turbine as claimed in claim 15 wherein:
    said hinge pin is rigidly connected to said rotatable side of said vane and actuating means is provided proximate said central shaft for rotating said hinge pin and said rotatable vane.

17. A wind turbine as claimed in claim 16 wherein said actuating means comprises:
    an actuating arm connected to said hinge pin and extending obliquely therefrom.

18. A wind turbine as claimed in claim 1 wherein:
    said sets of vanes each comprise a plurality of circumferentially spaced vanes forming a ring of vanes.

19. A wind turbine as claimed in claim 18 wherein:
    one of said sets of vanes is a front set at the end of said sets of vanes in the axial direction opposite to the wind direction; and the vanes of said front set have an aerodynamically passive shape whereby said front set is not rotated by wind substantially from the front.

20. A wind turbine as claimed in claim 18 wherein:

one of said sets of vanes is a front set at the end of said sets of vanes in the axial direction opposite to the wind direction; and the vanes of said front set comprise adjustable vanes each having an adjustable cross-sectional configuration adjustable between an aerodynamically active form whereby said front set is rotated by wind substantially from the front and an aerodynamically passive form whereby said front set is not rotated by wind substantially from the front.

21. A wind turbine as claimed in claim 20 wherein each adjustable vane comprises:

three sides forming a substantially triangular cross-sectional configuration having a front apex at one corner thereof substantially at the front of said vane;

a hinge pin at said front apex extending lengthwise of said vane and pivotally connecting two sides of said vane so that one of said two sides is rotatable about said hinge pin from the position thereof in said passive form to a position substantially coplanar with the other of said two sides.

22. A wind turbine as claimed in claim 21 wherein:

said hinge pin is rigidly connected to said rotatable side of said vane and actuating means is provided proximate said central shaft for rotating said hinge pin and said rotatable vane.

23. A wind turbine as claimed in claim 22 wherein said actuating means comprises:

an actuating arm connected to said hinge pin and extending obliquely therefrom.

24. A wind turbine as claimed in claim 23 wherein:

said actuating means further comprises an actuating ring around and movable axially relative to said central shaft and engageable with said actuating arms for displacing said actuating arms in a direction to rotate said hinge pin.

* * * * *